Dec. 16, 1969   C. L. WINDELER ET AL   3,483,597
RAM EXTRUSION OF GRANULAR RESINS
Filed Dec. 23, 1966
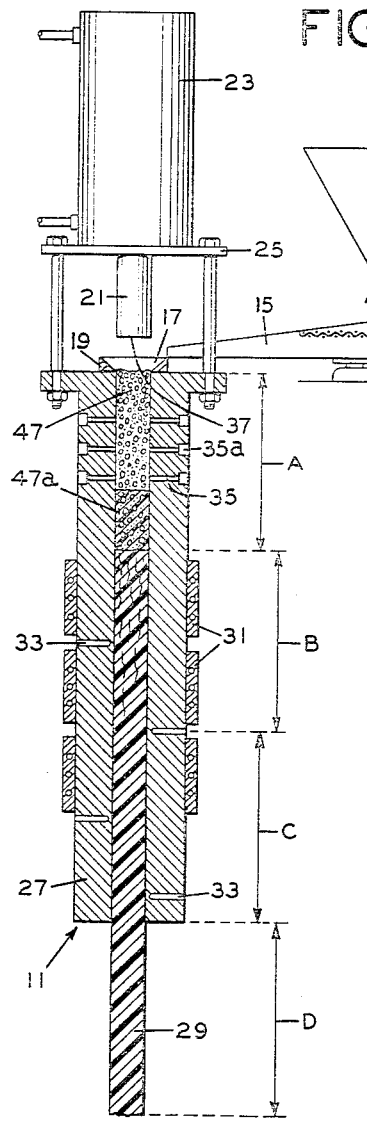
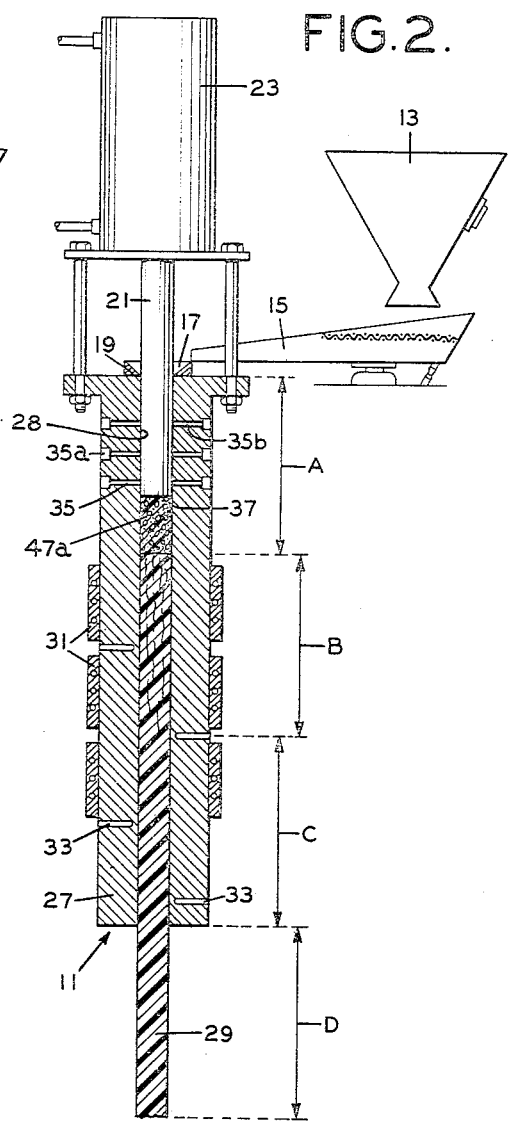
INVENTORS:
CHRISTOPHER L. WINDELER
JOSEPH D. SINGALEWITCH
BY
ATTORNEY

United States Patent Office 3,483,597
Patented Dec. 16, 1969

3,483,597
RAM EXTRUSION OF GRANULAR RESINS
Christopher L. Windeler, Convent Station, and Joseph D. Singalewitch, Bloomfield, N.J., assignors to Allied Chemical Corporation, New York, N.Y., a corporation of New York
Filed Dec. 23, 1966, Ser. No. 604,264
Int. Cl. B29f 3/014
U.S. Cl. 18—12
6 Claims

ABSTRACT OF THE DISCLOSURE

An apparatus for ram extrusion of polytetrafluoroethylene. Vent holes 35 are drilled in preform zone A of extruder to provide vents for occluded air in charge 47 so as to increase speed of extrusion while eliminating air pockets in extruded product. To prevent blockage, diameter of vent holes 35 is increased at outer portion 35a thereof.

---

This invention relates to an improved method and apparatus for the ram extrusion of certain non-flowing, shear sensitive thermoplastic resins, such as polytetrafluoroethylene (hereafter TFE).

Ram extrusion is a process wherein granular resin is compacted and fed through a die by the direct force of a ram on the resin. Basically, such an extruder consists of a hopper for feeding the material, a barrel for extrusion or forming of the material, and a ram as the means for exerting force on the material in the barrel. The barrel itself is divided into three areas: (1) the cold or preforming zone adjacent the feed point; (2) the heating zone; and (3) the die zone. In operation, a chrage is fed to the barrel and compacted under the force of the ram. Subsequent charges push the previous charges through the extruder; and the combination of heat and pressure combine to cause the resin to sinter or coalesce into a solid mass in the die zone.

Heretofore, the rate of extrusion of granular resins has been limited by several factors. If the extrusion rate were increase, the temperature of the barrel had to be increased in order to get good quality extrudate without voids. However, beyond a predetermined rate for a given extruder, any increased in barrel temperature was ineffectual in eliminating excess porosity in the product. Hence a limiting value for the rod extrusion rate was reached. It has been found that this porous nature of the extrudate is not the result of insufficient sintering; but rather is the result of occluded air in the resin in the barrel. Two characteristics types of flaws have been noted in the polytetrafluoroethylene extrudate as a result of this occluded air. These are the so-called "poker-chipping" which results from air occluded between the compacted parts and the appearance of cracking marks running crosswise along the extrudate.

By the process of this invention, however, this occluded air is removed by allowing it to vent through a plurality of small holes drilled into the extruder barrel in the performing zone thereof.

Other objects and features of the invention will become apparent by reference to the following specification and drawings.

In the drawings:

FIGURE 1 represents a schematic view of a typical ram extruder employing the instant invention with the ram in retracted position.

FIGURE 2 is a schematic view of the extruder showing the ram in its extended position.

Referring to the drawings, a typical vertical ram type extruder employed in the present invention is designated generally by the reference numeral 11. It comprises a vibratory hopper 13 leading to a vibratory feeder 15 which feeds the material into the charging port 17. A feeding funnel 19 is provided to prevent loss of material and assure even distribution of the resin in the preforming zone of the extruder.

A ram 21 is provided to compact the material and force it through the extruder 11. The ram 21 is preferably actuated by a pneumatic cylinder 23 mounted on a bearing plate 25.

The extruder barrel 27 is made up of three zones. In the first or preform zone A, the material is received from feeding port 17 (FIG. 1) and compacted by the action of ram 21 (FIG. 2). The preform zone may be defined generally as the zone extending from the charging port to the downstream end of a freshly compacted charge. The temperature in zone A is generally maintained below 500° F. Exceeding 500° F. encourages air entrapment and cold flow around the ram.

The preform zone A is followed by a second or heating zone B and a third zone C constituting a die. The heating zone is maintained at a temperature ranging from 650° F. to 900° F. As the compacted charge is advanced by succeeding strokes of the ram through the heating zone B and die C, pressure is exerted on the material as a result of its own thermal expansion within the die and the wall friction thereby creating sufficient back pressure for compression of the powder by the forward stroke of the ram 21. The granular resin is completely sintered and partially cooled as it passes through die C, and emerges as a continuous solid extrudate 29 into cooling zone D. Heat is provided for the heating zone B by heater bands 31 or other suitable means and the zone temperature is controlled through the use of thermocouples 33.

It has been found that the rate of such an extruder can be greatly increased without appreciably affecting the properties of the extruded stock 29 by providing at least two vent holes 35 through the barrel of the extruder in the preform zone A. These vent holes number at least two and preferably four to eight. They are preferably spaced circumferentially around the barrel of the extruder and extend along the barrel in the preform zone A between the charging port and the end point of travel of ram face 37, a distance at least about 25%, preferably 50%, of the distance between the charging port 17 and the end point of travel of the ram face. Additionally, it is preferred that at least one vent hole is provided in at least the downstream half of the preform zone. In this manner there is an exit for air at most stages of the preforming since holes extend throughout most of the area where the charge will be preformed. The holes range from about .015 inch to .125 inch in effective diameter at the internal surface of the extruder depending on the cross sectional area of the die. Generally speaking the smaller the cross sectional area of the die, the smaller the holes will be. Hole diameters below .015 will tend to block easily and thus be ineffective while hole diameters greater than .125 inch will generall allow excessive extrusion of the polymer therethrough. It has also been found that hole blockage can be greatly minimized by enlarging the effective diameter of the outer portion 35a of holes 35 to at least about 1.5 times the diameter of the hole at the inner surface 28 of the extruder barrel 27. The small inner portion 35b restricts passage or excessive extrusion of the polymer through the holes 35 while the enlarged outer portion 35a prevents blockage of the passageway by any polymer that may exude through the holes. A vacuum may be drawn on the exit of the holes to aid in removal of air. While some relatively fine filaments of polymer may exude out of the vent holes 35, they are not sufficiently dense to cause air blockage and are not sufficiently large to appreciably effect the output of the extruder. Moreover, the surface of the rod produced is still fully commercially acceptable.

In operation, granular TFE 47 is charged from hopper 13, via feeder 15 to preforming zone A through charging port 17 while the ram 21 is in retracted position (FIG. 1). The ram 21 is then actuated to compress and compact the material against previous charges. During this compaction step, any occluded air is allowed to bleed out through vent holes 35 spaced along the length of and around the circumference of the barrel in the preform zone A. This compacted charge 47a is moved through the heating and die zones B and C of the extruder by the force of subsequent charges, and during the course of passage through zones B and C is coalesced into a solid rod 29.

While an exemplary embodiment of the invention has been described, the true scope of the invention is to be determined from the following claims.

What is claimed is:

1. A ram extruder for forming substantially continuous extrudates from non-flowing, shear sensitive resins, said extruder comprising:
    (a) a barrel having a charging port, a preforming zone extending from said charging port to the downstream side of a freshly compacted charge of resin, a heating zone and a die;
    (b) an opening for feeding granular resin into said preforming zone;
    (c) a reciprocating ram for compacting material in the preforming zone and forcing the compacted material through the heating zone and die;
    (d) said preforming zone only having a plurality of vent holes therein extending through the barrel of the extruder; at least one of said vent holes being located in the downstream half of the preform zone.

2. The extruder of claim 1 wherein the vent holes range in diameter from about .015–.125 inch at the inner surface of the extruder barrel.

3. The extruder of claim 1 wherein the diameter of the outer portion of the vent holes is at least about 1.5 times the diameter of the inner portion of the vent holes.

4. The extruder of claim 3 wherein there are from 4–8 vent holes in the preform zone of the extruder barrel.

5. The extruder of claim 4 wherein the vent holes are spaced circumferentially around as well as along the preform zone.

6. The extruder of claim 5 wherein the vent holes extend along the preform zone between th charging port and the end point of travel of the ram face a distance at least about 25% of the distance between the charging port and the end point of travel of the ram face.

References Cited

UNITED STATES PATENTS

| | | | |
|---|---|---|---|
| 3,068,513 | 12/1962 | Chaffin | 18—12 |
| 952,960 | 3/1910 | Fernholtz. | |

WILLIAM J. STEPHENSON, Primary Examiner